United States Patent [19]

Hamilton

[11] Patent Number: 4,984,943
[45] Date of Patent: Jan. 15, 1991

[54] DRILL WITH BALANCED INSERTS

[76] Inventor: Martin N. Hamilton, R.D. #4, Middle Rd., Meadville, Pa. 16335

[21] Appl. No.: 357,204

[22] Filed: May 26, 1989

[51] Int. Cl.$^5$ ............................................. B23B 51/00
[52] U.S. Cl. ................................... 408/144; 408/188; 408/229; 408/713
[58] Field of Search ............... 408/713, 704, 705, 59, 408/144, 145, 186, 187, 188, 211, 223, 224, 225, 230, 233, 227, 229; 407/48, 54, 104

[56] References Cited

U.S. PATENT DOCUMENTS

| | | | |
|---|---|---|---|
| 3,320,654 | 5/1967 | Lovendahl | 407/104 |
| 4,124,328 | 11/1978 | Hopkins | 408/223 |
| 4,565,471 | 1/1986 | Negishi et al. | 408/204 |
| 4,676,702 | 6/1987 | Reinauer | 408/144 |
| 4,699,549 | 10/1987 | Shimomura et al. | 408/713 X |
| 4,770,571 | 9/1988 | Potemkin | 408/188 |

Primary Examiner—Z. R. Bilinsky
Attorney, Agent, or Firm—Charles L. Lovercheck; Wayne L. Lovercheck; Dale R. Lovercheck

[57] ABSTRACT

A drill has a shank with a central axis of rotation and at least one insert on one end of the shank. The insert has at least two cutting edges. The first and second cutting edges cooperate to form a hole when rotated about the central axis. One of the top and bottom faces acts as a seating face and the other acts as a cutting face. Cutting edges are formed on opposite sides of the cutting face. One end of each of the first cutting edges terminates in a juncture with a second cutting edge that extends from the cutting face toward the seating face. The first and second cutting edges cooperate to form a radiused hole when rotated about a central axis. The bottom of said hole is cut continuously across its entire area.

11 Claims, 2 Drawing Sheets

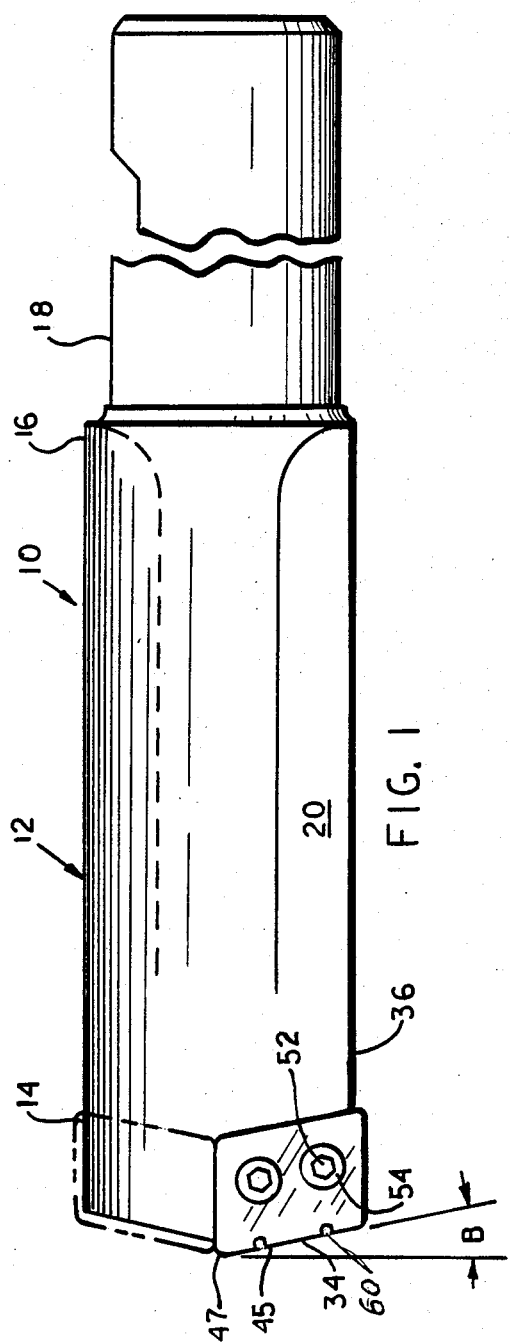

DRILL WITH BALANCED INSERTS

BACKGROUND OF THE INVENTION

The ordinary twist drill and the ordinary spade drill has two cutting edges disposed generally radial of one another and connected by a web. This wed is necessary in order to grind and sharpen the cutting edges of the drill.

The ordinary twist drill and the ordinary spade drill will drill a hole in a stack or layer of two or more plates, however, the web does cause resistance to drilling because at the web area no cutting can occur because there is due to its location on the drill axis cuts a minimal amount.

The newer metal cutting drills or hole mills which are designed to use each manufacturer's special design inserts will not drill a hole in a stack or layer of plates two or more because they do not cut through center on center. This design of drill develops a conical shaped where the drill exits the first part layer, this conical shaped disc then revolves with the drill making it impossible to cut this conical shaped disc into chips so that they may exit the cut. With the advancement of the drill feed and with rotation of the drill the only thing that can happen is for the drill to fail.

GENERAL STATEMENT OF THE INVENTION

Applicant has discovered that by referencing the cutting edges of a drill to a central reference plane with the cutting edges of the drill in planes that are substantially on the reference plane (manufacturing tolerances will not permit the cutting edges to be exactly on the reference plane) and by curving the ends of the cutting edges adjacent the axial center of the drill, the drill will drill a hole through a stack, or layers of plates. Moreover, the overall efficiency of the drill is improved by applicant's arrangement of cutting edges.

REFERENCE TO PRIOR ART

Applicant is familiar with the following patents, none of which disclose a drill having cutting edges substantially on or offset a very small amount from a center of rotation of the drill and having inner ends curved about a very small radius adjacent the center of rotation in the manner that applicant arranges his cutting edges. By the arrangement of cutting surfaces herein, applicant is able to drill holes through layered parts or stacked plates and the efficiency of the drill is improved.

U.S. Pat. No. 4,565,471, and those referred to in that Patent, provide several embodiments of a drill wherein the main cutting edges terminate in spaced relation to the axis of rotation of the drill so that a cylindrical core is created at the center of the hole. This core is occasionally twisted off by the rotating drill bit. This twisted off piece presents a source of trouble when drilling hard material. Applicant provides two straight cutting edges that are disposed substantially in the axis of rotation of the drill and terminates adjacent the center in curved parts to get to the shaped part. These curved ends continually cut at the center of the hole and leave no material to be twisted off. Moreover, applicant provides chip breaker grooves in his cutting inserts which help reduce chip size and facilitate chip removal.

OBJECTS OF THE INVENTION

It is an object of the invention to provide an improved drill.

Another object of the invention is to provide a drill that has cutting edges that cut substantially at the axis of rotation of the drill.

Another object of the invention is to provide a drill having cutting edges that are straight and terminate adjacent the drill's axis of rotation in an arcuate part that is tangent to the reference plane and cuts metal substantially up to the axis of rotation.

Another object of the invention is to provide a drill that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWINGS

FIG. 1 is a side view of a drill according to the invention.

FIG. 7 is a side view of the screw of holding the inserts in place.

FIG. 8 is a side view of a part of FIG. 7.

DETAILED DESCRIPTION OF THE DRAWINGS

Figure 3:
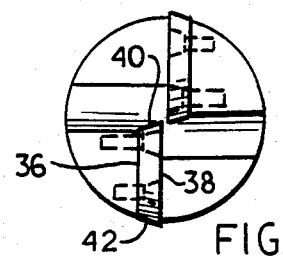
FIG. 3 is an end view of the drill shown in FIG. 1.
Figure 4:
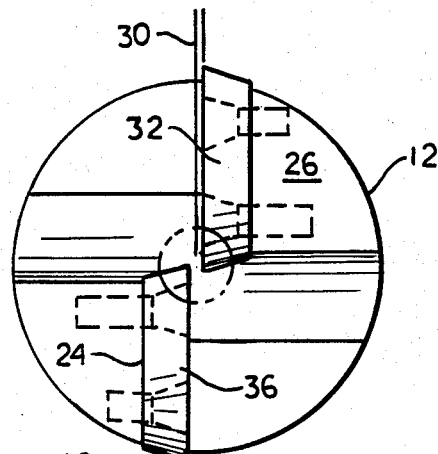
FIG. 4 is an enlarged view of FIG. 3.
Figure 5:
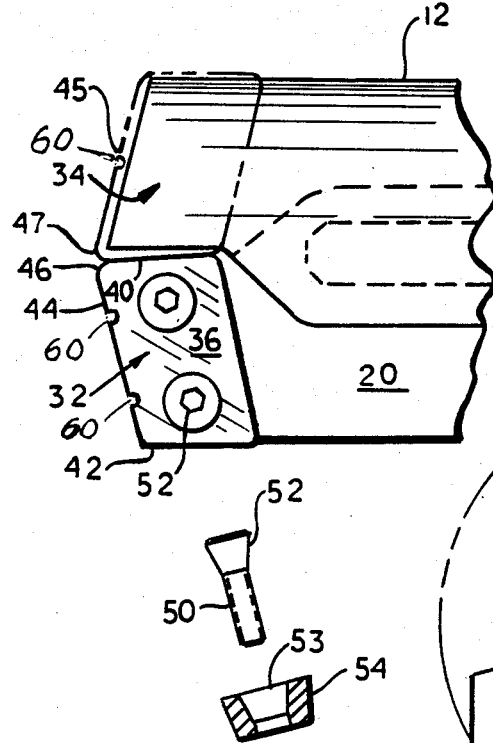
FIG. 5 is a cross sectional view taken on line 5—5 of FIG. 7.
Figure 6:
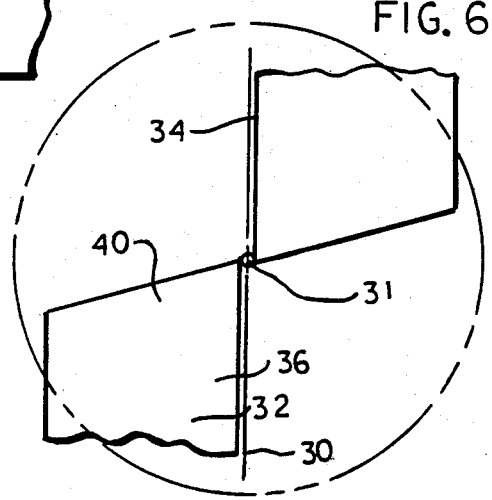
FIG. 6 is a diagrammtic end view of the drill shown in FIG. 3, shown to an enlarged scale.
Figure 2:
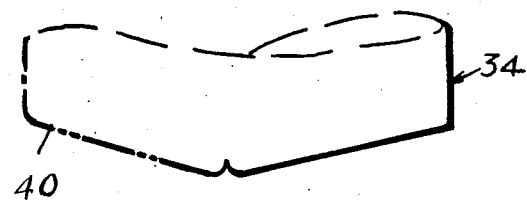
FIG. 2 is an end outline view of the bottom of the hole cut by the drill shown in FIG. 1 at a particular time.

Now with more particular reference to the drawings, I show a drill 10 having body 12. Body 12 has first end 14, second end 16 and tang 18 integrally attached to body 12. First planar surface 20 is formed on one side of body 12 and second planar surface 22 is formed on the other side of body 12, parallel to the plane of first planar surface 20. First planar surface 20 and second planar surface 22 support first insert 32 and second insert 34 having cutting edges disposed in planes that are disposed up to 0.015 inches apart on opposite sides of central axis of rotation 31 of drill 10. First planar surface 20 is formed on one side of drill 10 and second planar surface 22 is formed on the other side of drill 10 parallel to the plane of first planar surface 20. First planar surface 20 and second planar surface 22 form mounting surfaces for first insert 32 and second insert 34. First insert 32 and second insert 34 are generally parallelogram shaped of a type familiar to those skilled in the art.

Body 12, of drill 10, has a convex end surface made of first part 24 and second part 26. First insert 32 and second insert 34 are clamped rigidly to first planar surface 20 and second planar surface 22 by clamp screws 52 and clamp inserts 53, which are of a type familiar to those skilled in the art.

First insert 32 and second insert 34 each have first end 40, first side surface 38 and second side surface 36 which is parallel to first side surface 38, first end 40 and second end 42. First insert 32 has a first straight cutting edge 44 and first curved cutting edge 46. Second insert 34 has second straight cutting edge 45 and second curved cutting edge 47. First straight cutting edge 44 is tangent to first curved cutting edge 46. First straight cutting edge 44 and second straight cutting edge 45 have spaced notches 60 which act as chip breakers. Notches 60 in first insert 32 are staggered from notches 60 in second insert 34 to reduce chip size. The side edges of first insert 32 and second insert 34 will have a back taper A of about 15 degrees. First straight cutting edge 44 is inclined to a line 30 perpendicular to axis of rotation 31 at an angle of about 15 degrees of lead angle B.

Ideally, the radius of curvature of the arcuate first curved cutting edge 46 and second curved cutting edge 47 would be zero and first insert 32, and second insert 34 would come to a sharp point on axis of rotation 31 of drill 10. In practice, the points of first and second inserts would break off quickly and to remedy this matter first curved cutting edge 46 and second curved cutting edge 47 are provided which may have a radius of curvature of only about 0.015 inches. First curved cutting edge 46 and second curved cutting edge 47 cannot cut beyond axis of rotation 31 since this would be a reverse lead which would cause the tool to break. Consequently, first curved cutting edge 46 and second curved cutting edge 47 will cut a central core in the form of an inverted cone unless first straight cutting edge 44 and second straight cutting edge 45 are set on center radius of curvature of the curved side section. If first straight cutting edge 44 and second straight cutting edge 45 are set on their side of center, arcuate first straight cutting edge 44 and second straight cutting edge 45 cut constantly and no center post whatever is left or intermittently broken off during normal operation. When rotating drill 10 is properly set and lowered into engagement with a workpiece, a hole will be drilled having a substantially flat bottom which is formed by first straight cutting edge 44.

First insert 32 and second insert 34 are held to drill body 12 by headed screws 50. Screws 50 have frustoconical heads 52. Heads 52 fit into frustoconical holes 53 in frustoconical sleeves 54. First insert 32 and second insert 34 are clamped to first planar surface 20 and second planar surface 22 by screws 52. Fisrt insert 32 and second insert 34 are of a familiar type generally in the shape of a parallelogram with two flat parallel faces, two short parallel sides and two long parallel sides.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A drill comprising a body having an axis of rotation and a reference plane,
    said axis of rotation lying in said reference plane,
    a first insert and a second insert,
    means supporting said first insert and said second insert on said body,
    said first insert having a first cutting edge,
    said second insert having a second cutting edge,
    said first cutting edge comprising a first curved part and a first straight part tangent to said first curved part and forming a continuation of said first curved part,
    said second cutting edge comprising a second curved part and a second straight part tangent to and forming a continuation of said second curved part,
    said first cutting edge lying in a first plane,
    said second cutting edge lying in a second plane, said first and second planes being parallel to said reference plane and lying on opposite saids thereof
    said first plane and said second plane being substantially coextensive with one another and being substantially coextensive with said reference plane,
    the first curved part of said first cutting edge substantially overlapping the corresponding second curved part of said second cutting edge adjarent said axis,
    said cutting edges being adapted to cut a hole in a stack of plates.

2. The drill recited in claim 1 wherein each said insert has at least one notch therein interrupting said straight cutting edge,
    each of said notches in said first insert being spaced from said central axis different distance than said notches in said second insert whereby said notches act as chip breakers.

3. The drill recited in claim 1 wherein said first plane and said second plane are spaced from one another a distance less than 0.015 inches.

4. The drill recited in claim 3 wherein said curved cutting edges have a radius of curvature of less than 0.015 inches.

5. The drill recited in claim 4 wherein each of said straight cutting edges are disposed less than 0.015 inches from said axis of rotation of said drill.

6. The drill recited in claim 5 wherein said straight cutting edges are disposed at an angle of less than 90 degrees to said axis of rotation.

7. The drill recited in claim 6 wherein said first straight cutting edge joins said first curved cutting edge substantially at said axis of rotation and said second straight cutting edge joins said second curved cutting edge substantially at said axis of rotation.

8. A drill for drilling holes in metal comprising,
    a drill body having a first end, second end and a central axis,
    a first cutting insert and a second cutting insert supported on said second end of said drill body,
    a first cutting edge on said first insert adjacent said central axis,
    said first cutting edge comprising a first curved part and a first straight part disposed tangent to said first curved part and joining said first curved part,
    a second cutting edge on said second insert adjacent said central axis,
    said second cutting edge comprising a second curved part and a second straight part joining said second curved part and tangent to said second curved part,
    said first cutting edge being disposed in a first plane,
    said second cutting edge being disposed in a second plane,
    said central axis being disposed substantially midway between said first plane and said second plane,
    the curved part of said first cutting edge substantially overlapping the corresponding curved part of said second cutting edge, said first cutting edge and said second cutting edge being adapted to continuously cut a hole having a smooth bottom with a conical central projection.

9. The drill recited in claim 8 wherein said first insert and said second insert are fixed to said drill body by means of screws, said screw having heads received in both said inserts and theadably engaging said body whereby both said inserts are held to said drill body.

10. The drill recited in claim 9 wherein said first plane and said second plane are disposed less than 0.015 inches from said axis of rotation.

11. The drill recited in claim 10 wherein said curved cutting edges have a radius of curvature of about 0.015 inches.

* * * * *